(12) United States Patent
Young

(10) Patent No.: US 6,565,294 B1
(45) Date of Patent: May 20, 2003

(54) PLUNGE CUTTING DEVICE FOR NON-CIRCULAR SHAPES

(76) Inventor: Ralph C. Young, 2119 Payton Cir., Colorado Springs, CO (US) 80915

( * ) Notice: Subject to any disclaimer, the term of this patent is extended or adjusted under 35 U.S.C. 154(b) by 0 days.

(21) Appl. No.: 10/114,515

(22) Filed: Apr. 1, 2002

(51) Int. Cl.[7] .......................... B23B 51/06; B23B 51/08
(52) U.S. Cl. .......................... 408/22; 408/1 R; 408/22; 408/24; 408/117; 30/122; 30/381; 144/73
(58) Field of Search ................... 30/122, 381; 144/73, 144/144.1, 241; 408/1 R, 22, 24, 48, 30, 122, 117

(56) References Cited

U.S. PATENT DOCUMENTS

| | | |
|---|---|---|
| 2,985,204 A | 5/1961 | Kozak |
| 3,833,311 A | 9/1974 | Chailer |
| 3,884,280 A | 5/1975 | Chailer |
| 5,853,269 A | 12/1998 | Young |

Primary Examiner—W. Donald Bray
(74) Attorney, Agent, or Firm—Thomas W. Hanson

(57) ABSTRACT

A plunge cutting device for use with a portable drill, drill press, or other rotary drive source which is capable of cutting irregularly shaped openings or workpieces in a single operation. A drive chain, belt, or other means carries a plurality of cutting teeth along a path defined by a series of chain guides. A lower plate, adjacent the surface being cut serves as a finer resolution guide for the cutting teeth to define their cutting path. The configuration and orientation of the cutting teeth causes them to push inward against the edge of the plate so that they follow its shape closely. A preferred shield encloses the teeth, chain, and drive mechanism for safety and to serve as a vacuum shroud for dust collection. The shield may also act as a guide, holding the teeth in position prior to the start of the cutting operation. The lower plate is retractable, and preferably spring loaded, allowing the teeth to extend past when plunged into the material being cut and enabling the lower plate to act as a plug ejector to remove the cut piece of material.

19 Claims, 5 Drawing Sheets

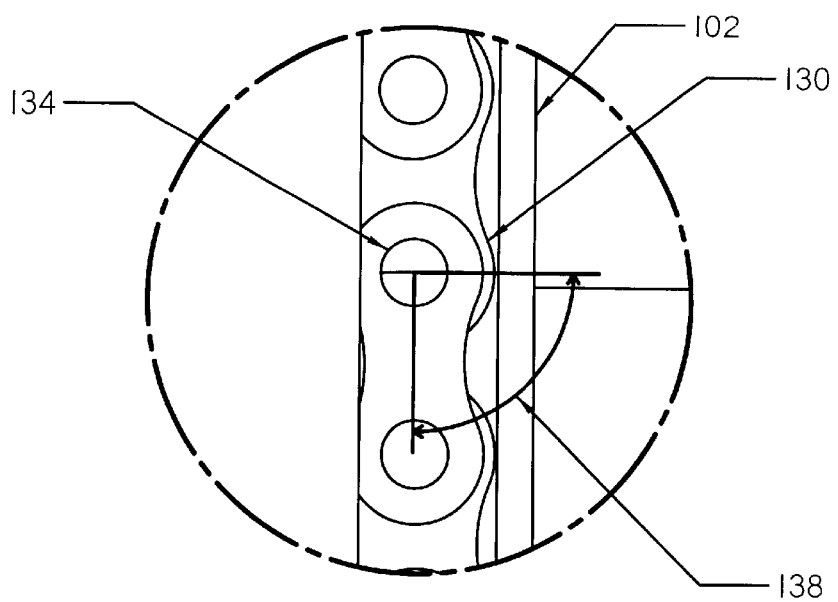
FIG. 7
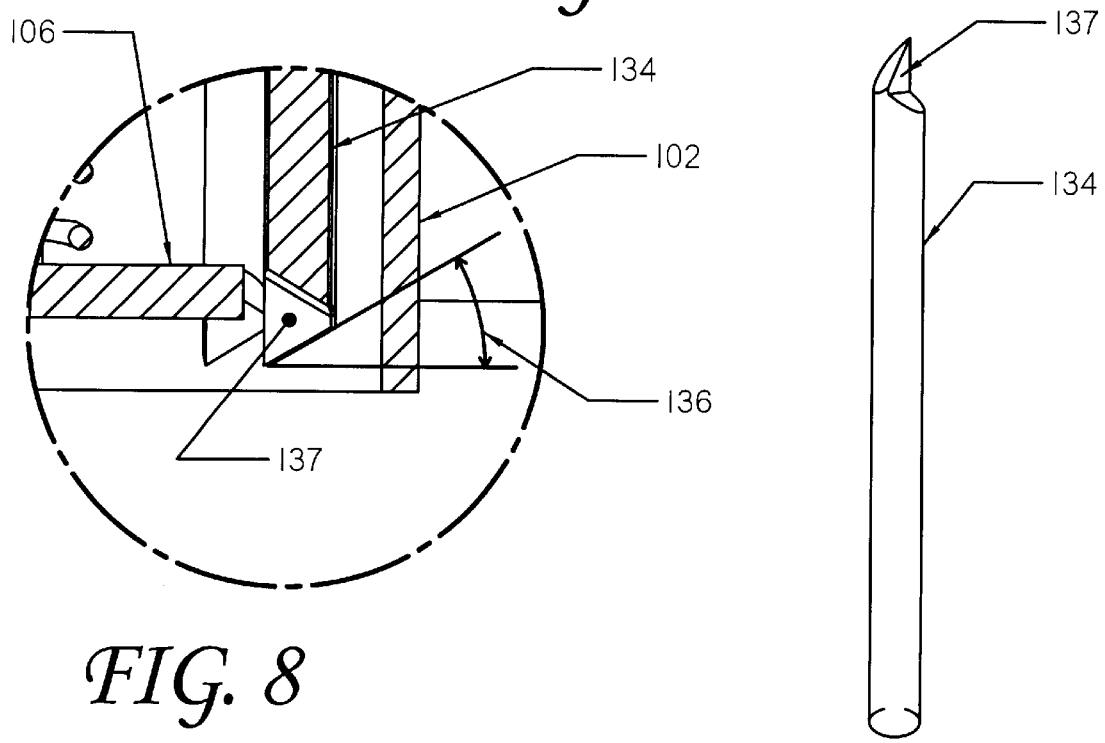
FIG. 8
FIG. 9

PLUNGE CUTTING DEVICE FOR NON-CIRCULAR SHAPES

BACKGROUND OF THE INVENTION

1. Field of the Invention

The present invention relates to the field of hole cutting devices and specifically to plunge cutting devices capable of cutting a non-circular opening in a single operation.

2. Background Information

There has long been a need to cut non-circular holes rapidly and precisely. Applications in need of this capability include installing electrical boxes in drywall; cutting mortises for timber frame construction and similar woodworking joinery; and cutting outlines for craftwork, cutting boards, etc. The most common approach is to use a saw, such as a bandsaw or reciprocating saw, to cut along the perimeter of the shape. This can be a length process and often results in lower precision than desired as it depends on the operator of the saw to follow a line drawn to indicate the cutting path.

Endless chain cutters provide a significantly faster operation and a repeatable, predicable cutting path defined by the path taken by the chain. Example US patents include U.S. Pat. Nos. 3,833,311 and 3,884,280 both to Chailer and U.S. Pat. No. 5,853,269 to the present applicant. Each of these discloses a cutter having teeth carried by an endless loop chain and driven by an electric drill or similar drive mechanism. The precision of these cutters is acceptable, but leaves room for improvement. The cutting teeth are typically quite long relative to the size of the chain on which they are mounted. As a result, they can apply significant torque about the chain, allowing them to displace both inward and outward from the path of the chain. Further, the chain itself is not tightly constrained, and can wander significantly from the desired path.

Applicant's previous patent, U.S. Pat. No. 5,853,269, addresses the precision problem by more tightly constraining the chain path by using channels rather than discrete guides and by providing a guide plate against which the teeth can bear. The teeth are then angled relative to their cutting direction to force them against the plate. This cutter has exhibited improved precision, but the teeth are still free to move outward when they are not engaged in the material. The result is that the teeth may start the cut outside of the desired cutting path and then track inward, leaving a somewhat ragged edge.

Prior endless chain cutters share several common problems. The first is that the large number of cutting teeth, simultaneously engaging the surface to be cut, apply significant rotational and linear forces to the cutter causing it to wander or jerk out of control. This is compounded by the fact that the operator can not grip the cutter itself to stabilize it, because of the teeth rapidly travelling around its perimeter. The typical solution has been to provide one or more drill points, commonly driven along with the cutting chain, which enter the material before the cutting teeth make contact. This alleviates much of problem, but the cutter is still free to tilt about these drill points, and where only one is used, is still free to rotate. The high forces generated by the cutter make it difficult for the operator to control the cutter and assure a smooth, even advancement of the cutter into the material. As a result, the prior cutters exhibit a tendency for the cutting teeth to jam in the material, suddenly stopping the cutter. The resultant kick back can damage the cutter, damage the surface being cut, and even injure the operator.

As mentioned briefly above, the prior endless chain cutters typically have the cutting teeth positioned to travel along the edge of the cutter. This exposes them to contact with the operator and with other elements in the environment. Were the operator to make contact with the rapidly moving teeth, injury would almost surely result. The teeth can also easily tangle clothing, hair, and even electrical cords.

The known prior cutters also typically generate a large amount of dust and debris in a very short amount of time. Where the material being cut is relatively hard, such as wood, this debris includes chips which can be flung outward by the teeth. Since the teeth are simultaneously cutting on all sides of the cutter, the debris is flung outward in all directions. This is both a safety hazard and a nuisance because the area which must be cleaned after using such a cutter can be extensive. Where the material is soft, such as plaster or drywall, the dust frequently becomes airborne, posing an inhalation threat and capable of traveling even greater distances before settling. In new construction, this may be less of a problem, but where the cutter is used in finished space, such as adding an outlet in an occupied room, such airborne dust, which may then settle on all of the furniture in a room, for example, is unacceptable.

There is a need for an improved endless chain cutter for cutting non-circular holes which offers improved precision in the cut. Further, the cutter should provide a more positive attachment to the surface being cut to avoid jamming and kickback. Ideally, the cutter would comprise a clutch or release mechanism to disconnect the drive in the event of a jam or other over torque situations. The cutter should incorporate a safety shield to enclose the cutting teeth and guard them from contact by the operator or with object in the surrounding environment. The cutter should also incorporate a dust shield to contain and preferably collect dust and debris generated by the cutter.

BRIEF SUMMARY OF THE INVENTION

The present invention is directed to an improved apparatus for cutting no-circular holes in a single plunging operation. The apparatus uses an endless chain carrying multiple cutting teeth, the chain traveling around and through chain guides so that it follows a path corresponding to the shape to be cut. A drive mechanism connects the chain to a portable drill or other removable drive.

According to the invention there is provided an upper plate mounting the guides, drive mechanism, and drive chain and a lower plate serving to guide the cutting teeth. The cutting teeth are shaped to provide optimal cutting action in combination with an inward force to hold them against the lower plate. The upper plate rides on guide posts fixed to the lower plate, thus maintaining the alignment of the upper plate relative to the lower.

According to an aspect of the invention a means for temporarily mounting the cutter to the surface being cut is provided. Preferably this means comprises two or more screws which pass through the cutter and into the surface. Alternatively, the screws may pass through the guide posts, thus positively attaching the lower plate to the surface, or they may pass through the shield, below, attaching it to the surface.

According to another aspect of the invention a shield is provided which encloses the cutting teeth and drive chain, acting as a safety guard. This shield may also serve to contain dust and debris generated by the cutting teeth. The shield preferably is fitted with a hose coupling for the connection of a vacuum cleaner or dust collector hose so that the dust and debris can be evacuated. The shield is mounted so that it retracts, or floats, relative to the teeth so that it remains in position as the teeth plunge into the material.

Further in accordance with the invention the drive mechanism may incorporate a clutch so that it will slip when a jam or over torque condition occurs.

Still further in accordance with the invention, the lower edge of the shield may closely follow the outline of the lower plate, further maintaining the cutting teeth in a path closely following the edge of the lower plate.

The present invention offers significant advantages over the prior art devices. The use of guide posts positively maintains the alignment of the upper and lower plates, reducing the chance that the upper plate could cock relative to the lower, causing the teeth to jam. This is especially true where the mounting screws attach the lower plate firmly to the surface being cut.

The shield provides both a safety guard and a dust collection shroud around the cutter. The operator is protected from contact with the cutting teeth and chain and the generated dust and debris is collected as it is generated, preventing it from becoming airborne. When used with a quality vacuum or dust collector, the cutter may be used in an occupied space with no risk of contaminating nearby surfaces.

Should a jam occur, the clutch in the drive mechanism will reduce the amount of kickback force felt by the user and applied to the cutting teeth. This reduces both the chance of operator injury and the likelihood of damage to the cutter itself.

The above and other features and advantages of the present invention will become more clear from the detailed description of a specific illustrative embodiment thereof, presented below in conjunction with the accompanying drawings.

BRIEF DESCRIPTION OF THE SEVERAL VIEWS OF THE DRAWINGS

FIG. 7 is a detailed view of a cutting tooth, shown from the bottom.

FIG. 8 is a detailed view of a cutting tooth, in the same cross section plane as FIG. 6.

FIG. 9 is a perspective view of a single cutting tooth.

DETAILED DESCRIPTION OF THE INVENTION

Figure 1:
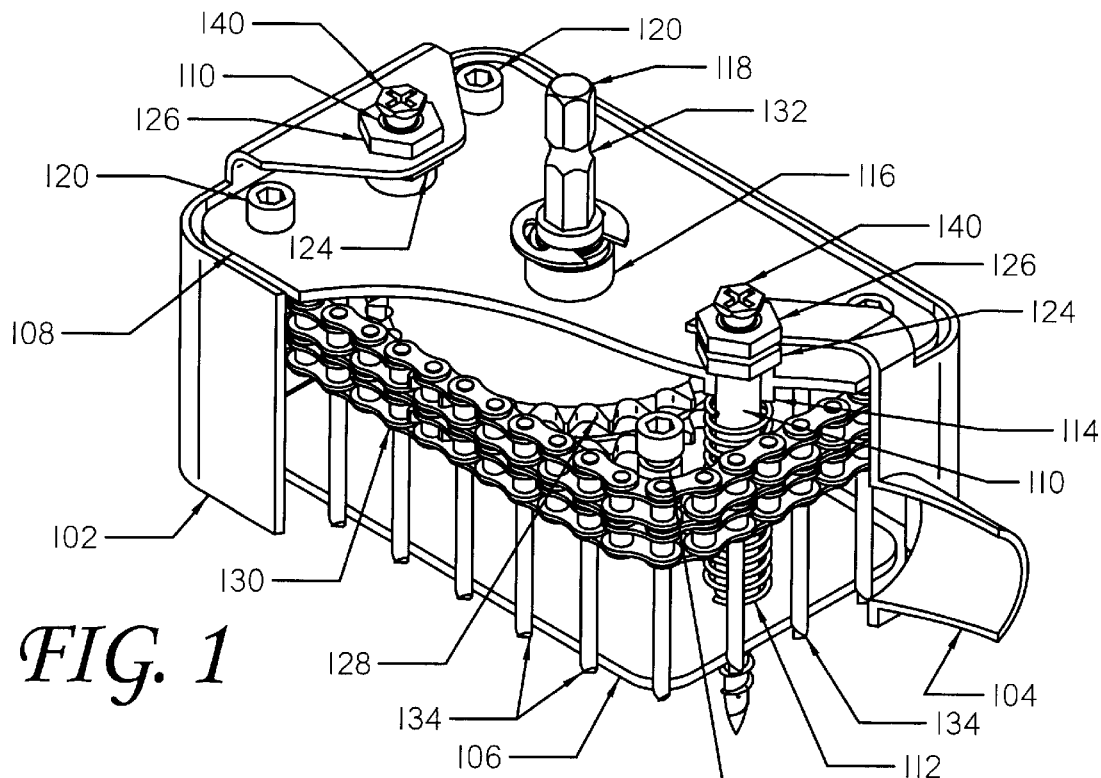
FIG. 1 is a cut-away view of the invention disclosing the internal mechanism.
Figure 2:
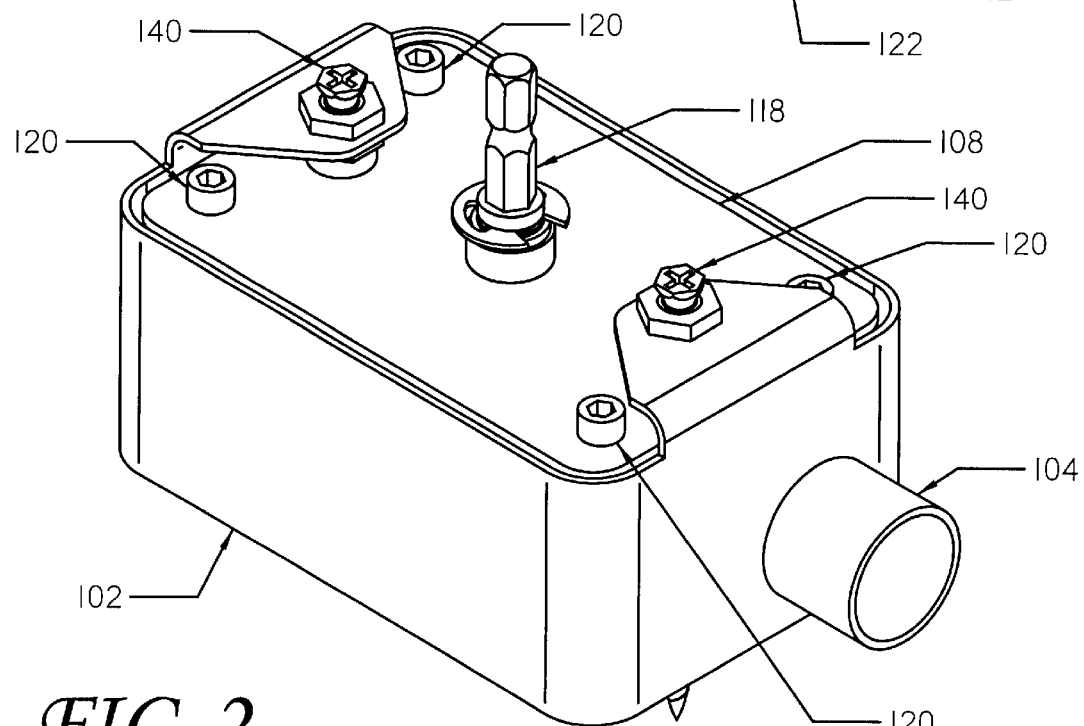
FIG. 2 is a perspective view of the invention.
Figure 3:
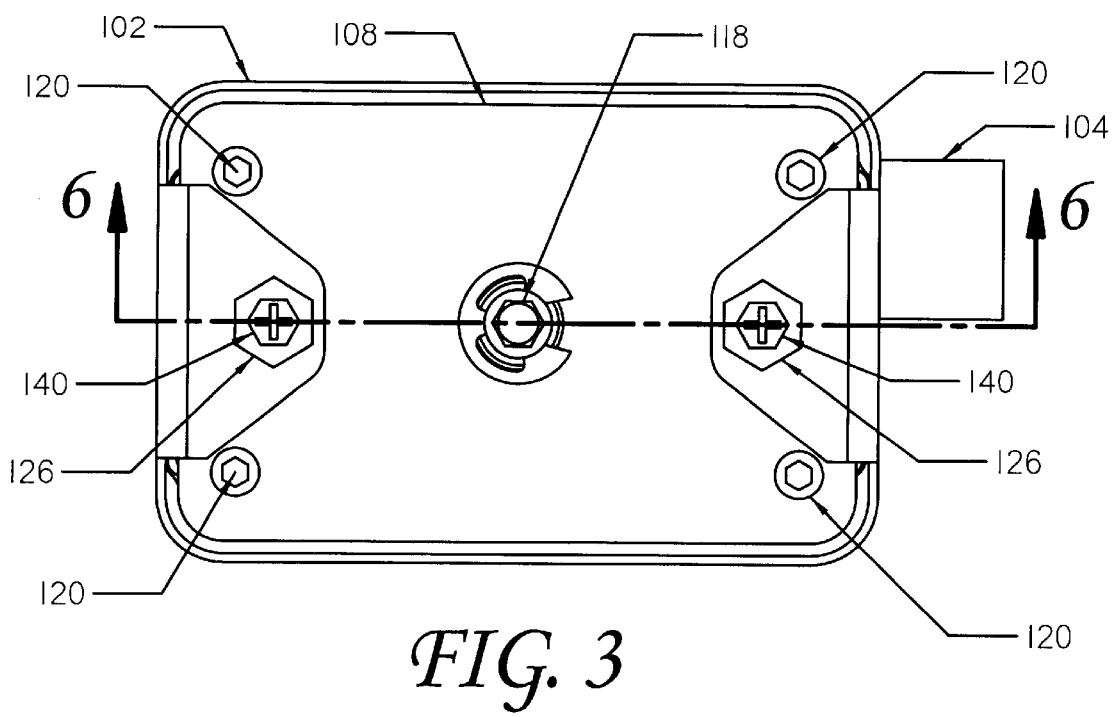
FIG. 3 is a top view of the invention.
Figure 4:
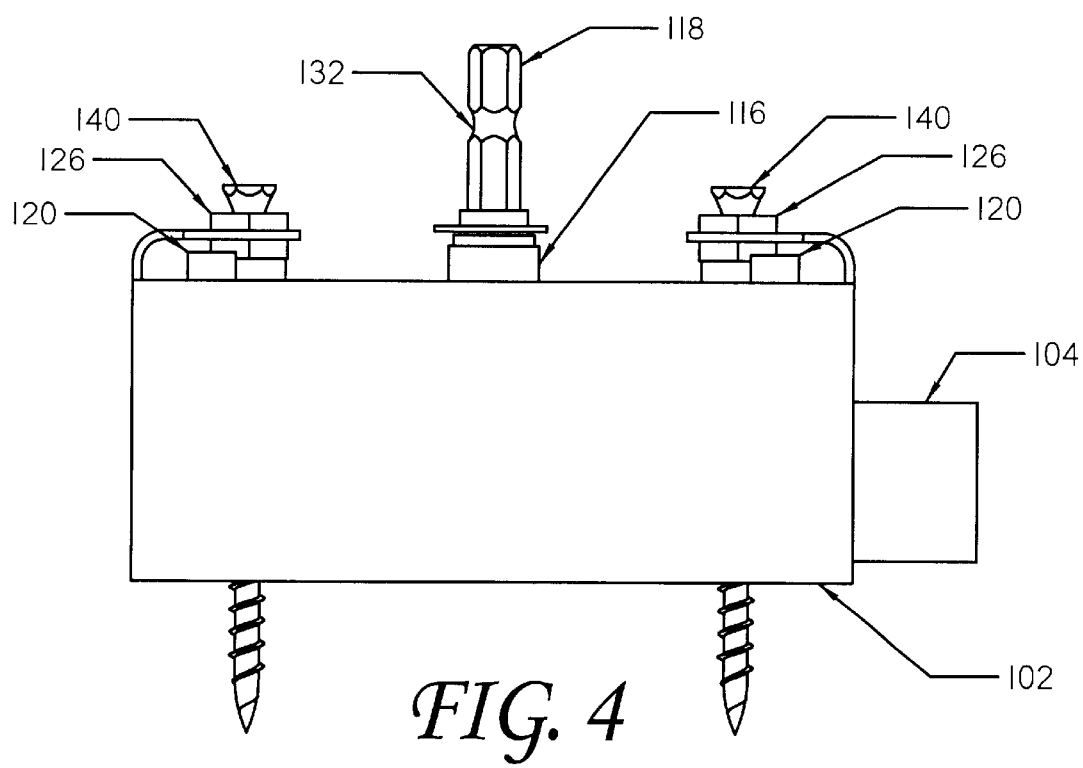
FIG. 4 is a side view of the invention.
Figure 5:
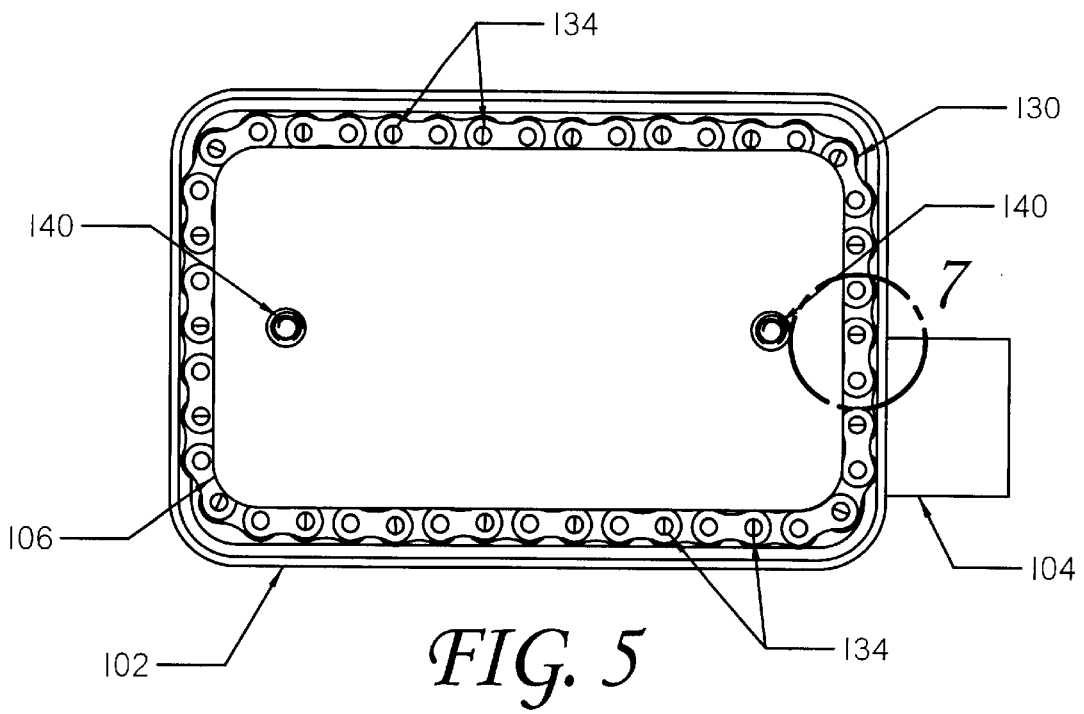
FIG. 5 is a bottom view of the invention.
Figure 6:
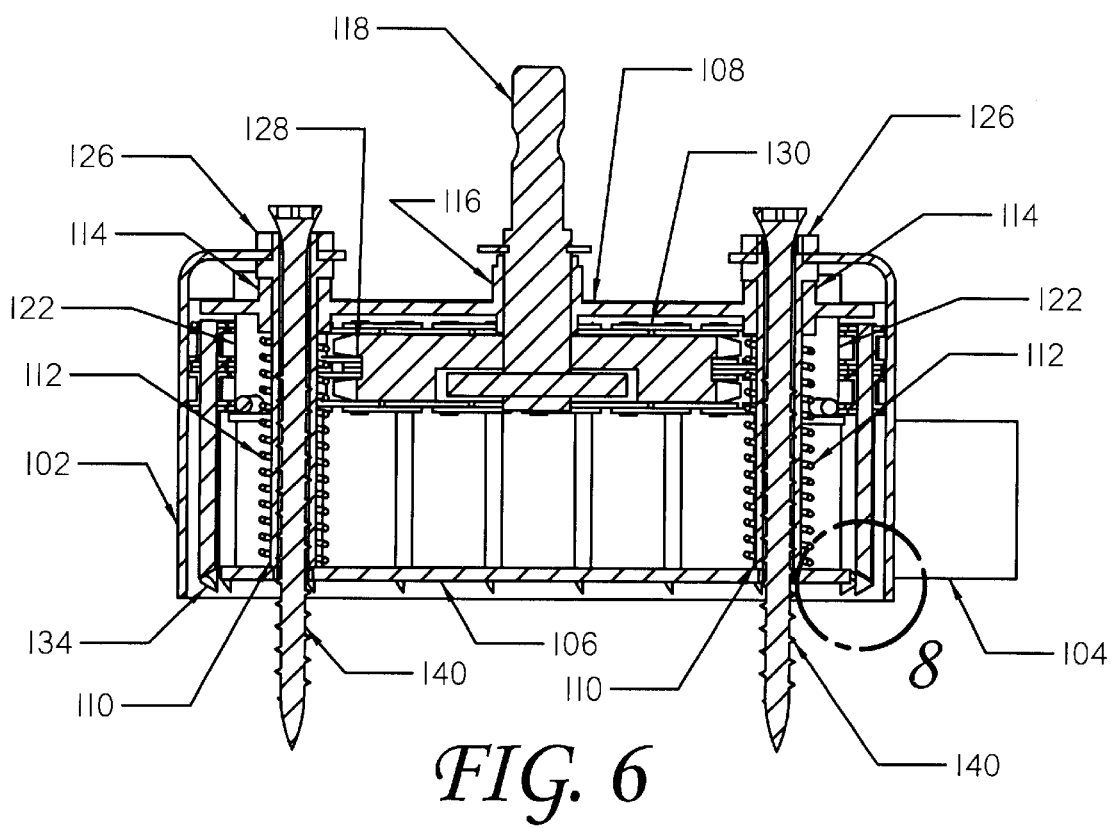
FIG. 6 is a cross section through the invention.

The following discussion focuses on the preferred embodiment of the invention, which is configured for use with a portable drill to cut opening for electrical boxes or similar. However, as will be recognized by those skilled in the art, the disclosed method and apparatus are applicable to a wide variety of situations in which it is desired or cut a non-circular shape in a single plunging operation. The shape may be any regular, symmetric shape, such as a diamond or triangle and may also be irregular such as the outline of a rabbit. The shape could even be circular, but the invention offers no particular advantage in that situation. The drive force may be applied by any rotary drive device such as a portable drill, stationary drill press, or even a hand operated device such as a brace conventionally used to drive wood boring bits.

Glossary

The following is a brief glossary of terms used herein. The supplied definitions are applicable throughout this specification and the claims unless the term is clearly used in another manner.

Chain Guides—those components over which the drive chain rides and which determine the path of the chain. These may be hardened steel, low friction plastic (such as UHDPE) or any other suitable material. They may be cylinders set at a corner, an elongated curve, a straight segment, or any other desired shape.

Drive Chain—the closed loop media which mounts the cutting teeth. While a roller chain in the preferred embodiment, this term should be understood to encompass other forms of drive chain; a cogged rubber belt; or any other applicable media capable of mounting and transmitting the drive force to the cutting teeth.

Drive Sprocket—that component mounted to the drive shaft and which transmits force to the drive chain. Its form may vary and will be adapted to the form of the drive chain: a toothed sprocket, as illustrated, for a roller chain; a pulley with transverse grooves or cogs for a cogged belt; etc.

Up, Down—while the device can be used in any orientation, for convenience down and downward reference a direction toward the tips of the cutting teeth while up and upward reference a direction toward the drive shaft.

Preferred Embodiment

The disclosed invention is described below with reference to the accompanying figures in which like reference numbers designate like parts. Generally, numbers in the 200's refer to prior art elements or elements in the surrounding environment while numbers in the 100's refer to elements of the invention.

Overview

The inventive cutting device is used to cut non-circular holes in a single plunging operation. A series of cutting teeth, mounted on a chain or belt, closely follow the edge of the lower guide plate cutting all portions of the shape simultaneously. Several novel features of the device improve the accuracy, ease of use, and cleanliness of the operation. This will be discussed in detail below.

Structure

The major components of the inventive device can be seen in FIGS. 1–6. The lower plate, 106, while simple in appearance, serves several roles in the device. First, it acts as a base for the device, bearing against the surface to be cut and mounting the guide posts, 110 on which the upper plate slides. It also functions as a plug ejector, forcing the core of material removed by the cutting device out of the teeth at the end of the operation.

Most importantly however, the lower plate serves as a guide for the teeth. Because of the shape and orientation of the teeth, discussed below, they press inward against the edge of the lower plate, following it closely as they travel around the perimeter. Working in concert with the course alignment of the drive chain by the sprocket and chain guides, the tracking of the lower plate perimeter by the teeth provides a fine alignment which enables the cutting of accurate and repeatable shapes by the inventive cutting device.

The guide posts, 110, are fixed to the lower plate and extend upward in parallel to guide and align the upper plate as it moves. In the preferred embodiment, the guide posts are hollow to provide a channel through which the mounting screws extend. The guide posts also provide an attachment point for the shield, 102. Nuts, 124, serve as a stop for the upward movement of the upper plate and as a mounting surface for the shield. Clearly these could also be clips, pins, or other components mounted to the guide posts. Nuts, 126, mount the shield to the posts.

It may be desirable for the guide posts to extend slightly beyond the lower plate so that they contact the material surface when the mounting screws are tightened, rather than the lower plate being flush to the surface. This would provide additional clearance between the ends of the cutting teeth and the surface, allowing the teeth to initially move freely. This would allow a relatively thin lower plate to be used without requiring tight manufacturing tolerances to keep the cutting teeth tips recessed behind the lower plate surface.

Springs, 112, encircle the guide posts and are positioned between the lower and upper plates urging them apart. This provides a positive return to retract the cutting teeth and allows the lower plate to function as a plug ejector. Clearly any suitable resilient means capable of urging the plates apart would be suitable and are considered equivalent to the springs.

Figure 10:
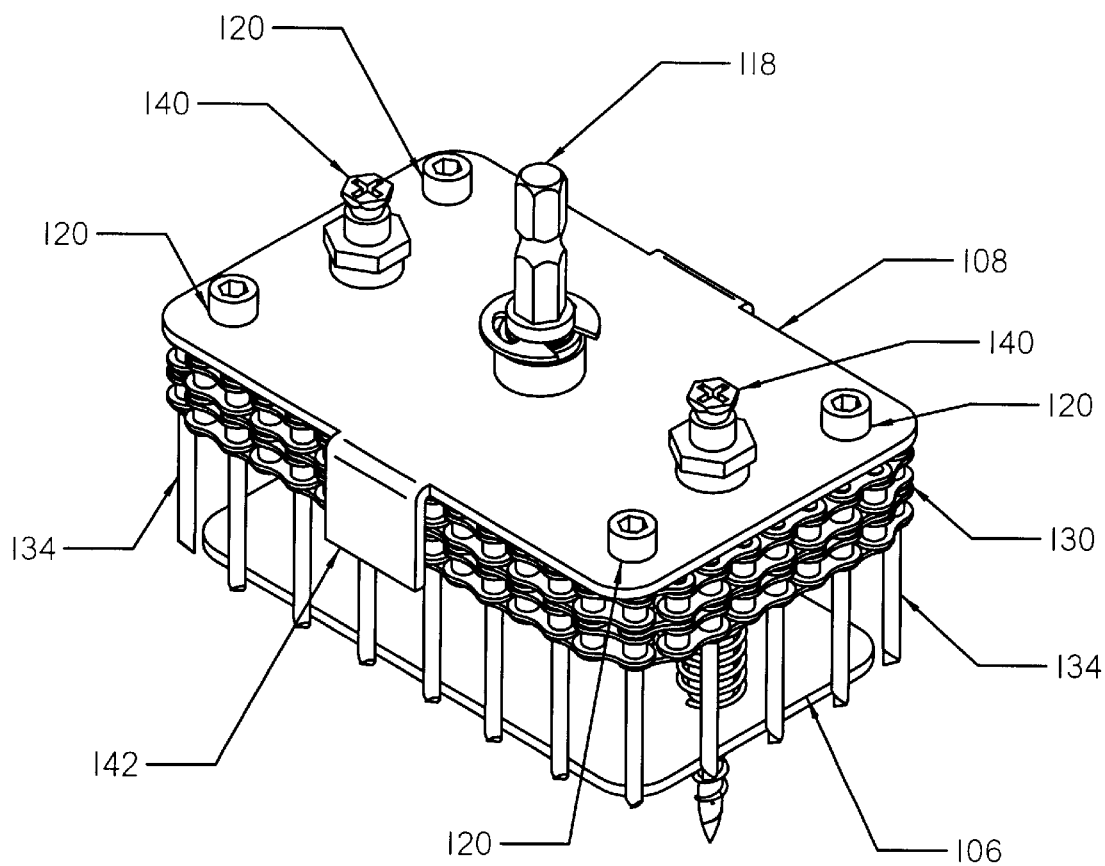
FIG. 10 is a perspective view of an alternative embodiment incorporating side tabs.

Upper plate, 108, rides on the guide posts and serves as the supporting structure for the majority of the other components. Bushings, 114, are optional but preferred. They ride on the guide posts, 110, and by providing contact along a greater length of the posts than would a simple hole through the upper plate, they substantially improve the alignment of the upper plate, helping prevent it cocking and potentially jamming. Bushing, or bearing, 116, receives the drive shaft, 118. Holes in the upper plate receive and locate screws, 120, which attach the chain guides, 122. The number and location of holes, and guides, will vary with the shape to be cut. Side tabs, 142 in FIG. 10, may be provided to hold the drive chain in mesh with the drive sprocket. This function may also be served by the shield, or may be unnecessary for some configurations or types of drive chain and sprocket.

Drive shaft, 1 118, passes through bushing, 116, in upper plate, 108, and connects to drive sprocket, 128, which in term connects to drive chain, 130. Preferably the sprocket is positioned so that it can engage the chain at least two separate locations along its length. This reduces the amount of slack in the drive chain and improves the tracking of the chain. Ideally, the engagement points are evenly distributed about the circumference of the chain path. If desired, the sprocket can engage the chain at only one point, and may be positioned either inside or outside of the chain loop. The drive shaft preferably has a hex drive head with groove, 132, adapted to engage the quick connect commonly used on screw guns and portable drills. If desired, the drive shaft may incorporate a clutch or other release mechanism which allows the drive shaft to slip relative to the drive sprocket under high torque. This would reduce the chances of damage or injury should the cutting teeth jam in the material. The clutch may be a friction clutch, pinned clutch, or any other configuration as is well known in the art for this type of application. Clearly, other configurations are possible. For example, the drive shaft can be eliminated, the sprocket supported by a bushing or other arrangement and define a hex opening and the coupling to the portable drill achieved by inserting a hex shaft, carried by the drill, into the hex opening in the sprocket.

Roller chain has proven to work well as the drive chain, 130. The pivoting links provide the requisite flexibility to follow the contours of the sprocket and guides while being relatively inflexible in other planes to provide the stability needed to align the cutting teeth. Cogged rubber belt, with sockets for the teeth preferably positioned at the cogs, is anticipated to also perform well although allowing greater lateral angular deflection of the teeth. This deflection is tolerable where a close fitting shield retains the teeth in position adjacent the lower plate. And advantage of the cogged belt is reduced noise from the device.

Chain guides, 122, are attached to the upper plate, 108, and positioned around the periphery of the cutter to define the path of the drive chain. This course alignment of the cutting teeth defines the general shape to be cut. The outline of the lower plate then refines the exact path of the cutting teeth as described herein. Generally, there will be one or more guides at any location where the chain path changes direction, such as corners. Guides may also be provided to create smooth curves or to maintain and extended straight path segment. Guides may be placed either to the inside or outside of the chain path in any combination. In the preferred embodiment, the guides are generally hardened steel cylinders. Low friction materials such as ultra high density polyethylene (UHDPE) are also applicable especially for curved and straight guides. Rollers mounted on bushings or bearings would also be applicable, especially at sharp corners. A guide could also be formed as a channel with the opposing walls guiding both sides of the chain.

The cutting teeth, 134, are elongate pins extending downward from the drive chain. They must be long enough to extend past the lower plate and through the material to be cut. When the lower plate is compressed against the upper plate. In the preferred embodiment, the pins replace at least some of the coupling pins in the roller chain which serve to interconnect the chain links. The configuration of cutting face, 137, of the teeth, as detailed in FIGS. 7 and 8 preferably comprises two important angles and their orientation. The point angle, 136, forms a single point to one side of the cutting tooth, and the tooth is oriented so that this point is substantially adjacent the lower plate. In the preferred embodiment the point angle is approximately 45 degrees but the teeth are functional with a relatively wide range of point angles. The face angle, 138, is the angle of the cutting face relative to the direction of travel of the tooth. In the preferred embodiment this is substantially perpendicular. The configuration of point placement and point angle results in a cutting tooth which draws into the lower plate with a face angle of 90 degrees. This provides improved cutting action over a tooth which has to be angled to draw into the plate. The placement of the point in combination with the above angles serves to draw the cutting tooth into the edge of the lower plate. The teeth thus bear against the edge of the lower plate, closely tracking its outline as the teeth make their cut. The result is a more precise, accurate, and repeatable shape cut than is provided by prior art devices which rely on guiding only the chain. Note that there is also a conventional relief angle to the rear of the cutting tooth.

The optional but preferred shield, 102, like the lower plate fills several roles. It is designed to extend slightly beyond the tips of the cutting teeth and to contact the surface of the material being cut before the cutting teeth. It then floats relative to the cutting device maintaining contact with the surface of the material as the cutting teeth are plunged into and through the material, making the cut. In the preferred embodiment this is achieved by attaching the shield to the top of the guide posts. An alternative, discussed below, is to use the mounting screws to attach the shield to the material surface rather than the lower plate. If desired, the shield can be manufactured from a clear material, such as polycarbonate, to allow the operator to view the positioning and operation of the cutter.

A first role of the shield, 102, is as a safety device, enclosing the cutting teeth and drive mechanism and providing a barrier between the operator of the tool, and especially the operator's fingers, and the moving parts of the device. Secondly, the shield contains the chips and dust generated by the cutting device preventing them from flying outward and causing injury or damage. In combination with the hose coupling, 104, the shield forms a dust collecting cavity which, when coupled to a vacuum cleaner or dust collector, evacuates the chips and dust, preventing build up within the cutting device and maintaining a clean environment. This would allow a hole to be cut in drywall, for example, without putting dust into the air or on the floor or other surfaces. This eliminates any subsequent clean up and avoids the mess of conventional approaches.

Finally, the shield, 102, can also serve as a guide for the cutting teeth. While the teeth feed into and align against the lower plate, this occurs only while they are actively cutting material. Before the teeth engage the material, they are free to move to the extent allowed by the drive chain. The shield can be formed to closely follow the contour of the lower plate, allowing a narrow channel somewhat larger than the width of the cutting teeth. In this way, the teeth are positioned very near their final cutting path, allowing them to start the cut in substantially the ideal path. This results in a cleaner cut, with sharper edges than if the teeth were to start the cut further from the lower plate and then track inward. This feature becomes more important where longer teeth are used (to penetrate thicker material) or where a more flexible drive chain, such as a cogged rubber belt, is used.

In the preferred embodiment, the shield is straight sided and sized to clear the drive chain. As a result, the shield to lower plate gap is too large for the shield to effectively act as a guide. However, the shield could clearly be flared to provide a narrow gap at the lower edge and sufficient room at the top for the chain. Alternatively, an inwardly extending lip could be formed on, or preferably attached to, the lower edge of the shield to serve as the guide. This offers the advantages of being replaceable when worn and allowing a generically shaped shield, such as a rectangle, to be adapted to a specific shape. Where a drive belt is used, significantly less clearance is needed between the belt and the shield and the straight sided shield would be functional as a guide.

Mounting screws, 140, attach the cutting device to the material surface being cut. This positively positions the device to avoid wandering and reduces the chance of kickback, and possible resultant injury, should the cutting teeth jam. In the preferred embodiment, the mounting screws pass through the guide posts, 110, and penetrate the material in the area within the circumference of the cutters. This is preferable where this enclosed area is considered waste as it would, for example, where the cutter is used to cut holes for electrical boxes or heat registers during construction. The holes from the mounting screws are in this waste material and do not mar the surrounding wall. Alternatively, as discussed below, the mounting screws could pass through the shield, positioning them outside of the cutting teeth. This would be preferred where the material inside the cutting path is the desired product, such as when cutting out decorative shapes, and the exterior material is the waste. Ideally, the mounting screws have a hex head of the same size as the drive shaft. This allows the operator to position the device, drive the mounting screws, and then attach to the drive shaft and make the cut, all with the same driver and without changing bits or couplings. Clearly the mounting screws could also incorporate a secondary coupling such as a screwdriver slot. If desired, the mounting screws could also be eliminated.

Operation

Operation of the inventive cutting device is quite simple, which is one of the advantages of the invention. Preferably, the device is used in combination with an electric drill fitted with a hex drive socket matched in size to the mounting screws and drive shaft. The cutting device is positioned on the surface of the material to be cut, aligned with the desired hole, cutting teeth facing the surface. The drill is then used to drive the mounting screws into the surface, fixing the device in position. The drill is then coupled to the drive shaft and activated, putting the cutting teeth in motion. The drill is then pressed forward, toward the material face, plunging the cutting teeth into the material. The operator regulates the feed rate as appropriate to the material. For drywall, this rate can be quite rapid, completing the cut in only a few seconds. With the cut complete, the drill and cutting device are withdrawn, extracting the plug and leaving a clean hole. The drill is then used to back out the mounting screws, freeing the plug from the cutter. The entire operation, start to finish, can be performed in less than a minute for a typical drywall cutting operation. The fact that the preferred embodiment, where the mounting holes are within the cutting chain loop, positively holds the plug, extracting it from the hole is a significant advantage where the user does not want the plug to fall inside of a hollow wall where it may be difficult, or impossible, to retrieve.

Alternative Embodiments

The following discussion presents alternative embodiments which offer various advantages in structure or functions without departing from the principles of the invention.

The most obvious alternatives are variations in the shape and size of the hole being cut. While illustrated above for a substantially rectangular shape appropriate for electrical boxes or the like, the invention is not so limited. It has been demonstrated for a range of sizes including gang boxes and air register openings. It is also capable of cutting other shapes such as animal outlines for craft work, guitar faces for instrument making, and an almost unlimited range of geometric and other shapes.

While the preferred embodiment is adapted for use with a portable electric drill, the invention is equally applicable to other power sources, both portable and stationary. For production of crafts shapes, such as animal silhouettes, the device may be used with a stationary drill press. For such an operation, the mounting screws can be eliminated and the cutter stabilized either by hand or by bracing against the drill press, to prevent it rotating before the cut is started. This configuration offers production rates far better than can be achieved cutting the same shapes with a bandsaw or jigsaw.

Where used, the mounting screws may be used to attach the shield to the material rather than attaching the lower plate. The main advantage of this approach is that it places the mounting screws, and the holes they make in the material, outside of the cutting chain path. This is desirable where the material to the outside is considered waste, with the shape inside the path being the desired result.

The mounting screws may also be eliminated, replaced by pins, or points, which are simply pressed into the material. For soft materials which cut easily and offer little chance of binding the cutter, such as drywall, such pins may provide sufficient stabilization of the cutter and would further increase the speed and simplicity of operation.

Clearly the hose coupling, for connection of a vacuum cleaner, can be attached in other positions and orientations. Positioning it on any side and at any angle is clearly an option. Enclosing the top of the shield and having the hose coupling on that upper surface so that it extends back towards the operator, in substantially the same direction as the drill used to drive the cutter offers certain advantages in clearance and possible operator handling of the vacuum hose.

The preferred embodiment uses a relatively thin, sheet metal lower plate with straight edges. This works well, but requires that the cutting teeth extend beyond the plates upper surface at all times. Realistically, this means that they always extend at least slightly beyond the lower surface of the plate, being exposed within the shield. If desired, a thicker plate can be used providing sufficient space that the points of the teeth, when retracted, are positioned adjacent the edge of the plate, neither above the plate—causing them to jam, nor below the plate—posing a risk to the operator. A further alternative would be to tape the edge of the plate, inward toward the top, so that it would guide the teeth outward as they descend. This could allow the teeth to retract above the plate without jamming.

While the preferred form of the invention has been disclosed above, alternative methods of practicing the invention are readily apparent to the skilled practitioner. The above description of the preferred embodiment is intended to be illustrative only and not to limit the scope of the invention.

I claim:

1. A plunge cutting device, said device comprising:
   (a) an endless loop drive chain;
   (b) plural cutting teeth, attached to said drive chain and extending downward;
   (c) a drive sprocket engaging said drive chain;
   (d) a drive shaft engaging said drive sprocket and adapted for coupling to a rotary drive device;
   (e) plural chain guides adapted to guide said drive chain in a pre-determined path;
   (f) a lower plate positioned within the circumference of said drive chain path;
   (g) at least one guide post fixedly attached to said lower plate;
   (h) an upper plate, slideably attached to said guide post and mounting said drive means and said chain guides; and
   (i) resilient means adapted to urge apart said lower plate and said upper plate.

2. The plunge cutting device of claim 1 wherein said lower plate has an outer edge which defines a cutting path for said cutting teeth and said cutting teeth bear against and follow said lower plate.

3. The plunge cutting device of claim 1 further comprising mounting means for removably attaching said cutting device to a surface being cut.

4. The plunge cutting device of claim 3 wherein said guide post defines a lengthwise hole therethrough and wherein said mounting means comprises at least one screw passing through said guide post hole.

5. The plunge cutting device of claim 3 wherein said drive shaft adapted to couple to a rotary drive shaft is adapted to be received by a releasable coupling on the rotary drive device and wherein said mounting means comprises at least one rotary fastener adapted to be received by the same releasable coupling.

6. The plunge cutting device of claim 1 further comprising a shield enclosing said drive chain and said cutting teeth, said shield retractable relative to said cutting teeth.

7. The plunge cutting device of claim 6 wherein said shield is attached to said guide posts.

8. The plunge cutting device of claim 6 further comprising mounting means for removably attaching said cutting device to a surface being cut.

9. The plunge cutting device of claim 8 wherein said mounting means removably attaches said shield to the surface being cut.

10. The plunge cutting device of claim 6 further wherein said shield further comprises a hose coupling whereby air can be drawn out of said shield.

11. The plunge cutting device of claim 1 wherein said drive shaft comprises a release mechanism which allows said drive shaft to rotate relative to said drive sprocket if a predetermined torque is exceeded.

12. A plunge cutting device, said device comprising:
   (a) a drive means adapted for connection to a rotary drive device
   (b) an endless loop drive chain, engaging and driven by said drive means, said drive chain carrying a plurality of cutting teeth, each tooth having a cutting tip on the distal end thereof;
   (c) a lower plate positioned within the circumference of said drive chain path and retractable relative to said drive chain, said lower plate having an outer edge defining a cutting path for said cutting teeth; and
   (d) a shield enclosing said cutting teeth, said shield retractable relative to said cutting teeth;
      wherein the cutting action of said cutting teeth urge them inward causing them to bear against and follow said outer edge of said lower plate.

13. The plunge cutting device of claim 12 wherein each of said cutting tips comprises a point to one side of said tooth substantially adjacent said outer edge of said lower plate.

14. The plunge cutting device of claim 13 wherein each of said cutting tips comprises a cutting face having a face angle of substantially 90 degrees relative to the direction of travel.

15. The plunge cutting device of claim 12 wherein said drive means comprises a release mechanism which allows said rotary drive device to rotate relative to said drive chain if a predetermined torque is exceeded.

16. The plunge cutting device of claim 15 further wherein said shield further comprises a hose coupling whereby air can be drawn out of said shield.

17. The plunge cutting device of claim 12 wherein said shield closely follows the contour of said lower plate outer edge defining therebetween a narrow gap having a width only somewhat greater than the width of said cutting teeth.

18. The plunge cutting device of claim 17 wherein said shield guides said cutting teeth, retaining them in a position proximate said lower plate outer edge.

19. The plunge cutting device of claim 18 wherein said shield comprises a removably attached inwardly extending lip which defines said gap.

* * * * *